(12) United States Patent
Cothren et al.

(10) Patent No.: US 12,422,065 B1
(45) Date of Patent: Sep. 23, 2025

(54) FORMED INTERNAL SURFACE TUBULAR CONNECTION

(71) Applicant: BENOIT PREMIUM THREADING, LLC, Houma, LA (US)

(72) Inventors: Preston Cothren, The Woodlands, TX (US); Maya Marchant, Spicewood, TX (US)

(73) Assignee: BENOIT PREMIUM THREADING, LLC, Houma, LA (US)

( * ) Notice: Subject to any disclaimer, the term of this patent is extended or adjusted under 35 U.S.C. 154(b) by 0 days.

(21) Appl. No.: 18/538,646

(22) Filed: Dec. 13, 2023

Related U.S. Application Data

(60) Provisional application No. 63/387,226, filed on Dec. 13, 2022.

(51) Int. Cl.
*F16L 15/00* (2006.01)
*F16L 15/04* (2006.01)
*E21B 17/042* (2006.01)

(52) U.S. Cl.
CPC ............ *F16L 15/001* (2013.01); *F16L 15/04* (2013.01); *E21B 17/042* (2013.01)

(58) Field of Classification Search
CPC ..... F16L 15/001; F16L 15/004; F16L 15/006; F16L 15/009; F16L 15/04; F16L 15/08; E21B 17/042

See application file for complete search history.

(56) References Cited

U.S. PATENT DOCUMENTS

| | | | | |
|---|---|---|---|---|
| 4,712,815 A | * | 12/1987 | Reeves | F16L 15/004 285/379 |
| 4,753,460 A | * | 6/1988 | Tung | E21B 17/0423 285/331 |
| 4,786,090 A | * | 11/1988 | Mott | F16L 15/04 285/332.3 |
| 4,813,717 A | | 3/1989 | Watts | |
| 4,928,999 A | * | 5/1990 | Landriault | F16L 15/04 285/334 |
| 5,143,411 A | | 9/1992 | Watts | |
| 5,427,418 A | | 6/1995 | Watts | |
| 5,516,158 A | | 5/1996 | Watts | |
| 5,826,921 A | | 10/1998 | Woolley | |

(Continued)

FOREIGN PATENT DOCUMENTS

| | | |
|---|---|---|
| AU | 2007210216 | 8/2007 |
| AU | 2013320266 | 3/2014 |

(Continued)

*Primary Examiner* — David Bochna
(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

An improved tubular connection apparatus having a pin section with external tapered threads and a box section with internal tapered threads. The tubular connection apparatus uses the relationship between an internal surface diameter and a transition region to create a connection that utilizes both a mating external shoulder that has an outer diameter equal to the tube and that preferably "straddles" the transition region such that the internal pin member also retains full benefit from the formed internal surface diameter all the way to the last engaged pin thread and thereby increasing the pin member tension strength.

20 Claims, 16 Drawing Sheets

(56) References Cited

U.S. PATENT DOCUMENTS

| | | |
|---|---|---|
| 6,322,110 B1 | 11/2001 | Banker et al. |
| 6,435,569 B1 * | 8/2002 | Hopkins ............... F16L 15/009 |
| | | 285/390 |
| RE39,869 E | 10/2007 | Payne et al. |
| 7,527,304 B2 | 5/2009 | Mallis et al. |
| 7,717,478 B2 | 5/2010 | Reynolds, Jr. |
| 7,780,202 B2 | 8/2010 | Breihan et al. |
| 10,961,787 B2 | 3/2021 | Ethridge et al. |
| 2003/0075924 A1 | 4/2003 | Olivier |
| 2004/0021314 A1 * | 2/2004 | Pina ...................... F16L 15/04 |
| | | 285/94 |
| 2005/0248153 A1 | 11/2005 | Sugino et al. |
| 2007/0132237 A1 | 6/2007 | Sivley, IV et al. |
| 2007/0228729 A1 | 10/2007 | Grimmett et al. |
| 2009/0200798 A1 | 8/2009 | Hamamoto et al. |
| 2012/0325361 A1 * | 12/2012 | Durivault .............. F16L 15/004 |
| | | 138/109 |
| 2016/0160575 A1 | 6/2016 | Hou et al. |
| 2017/0146160 A1 | 5/2017 | Banker |
| 2018/0080287 A1 * | 3/2018 | Yoshikawa ........... E21B 17/042 |
| 2019/0330929 A1 | 10/2019 | Breen et al. |
| 2020/0208760 A1 | 7/2020 | Raje |
| 2023/0066104 A1 * | 3/2023 | Ott ....................... E21B 17/042 |
| 2023/0088330 A1 | 3/2023 | Breen et al. |

FOREIGN PATENT DOCUMENTS

| | | |
|---|---|---|
| CA | 2697539 | 3/2009 |
| EP | 1175577 | 7/2004 |
| WO | WO 2013073712 | 5/2013 |

* cited by examiner

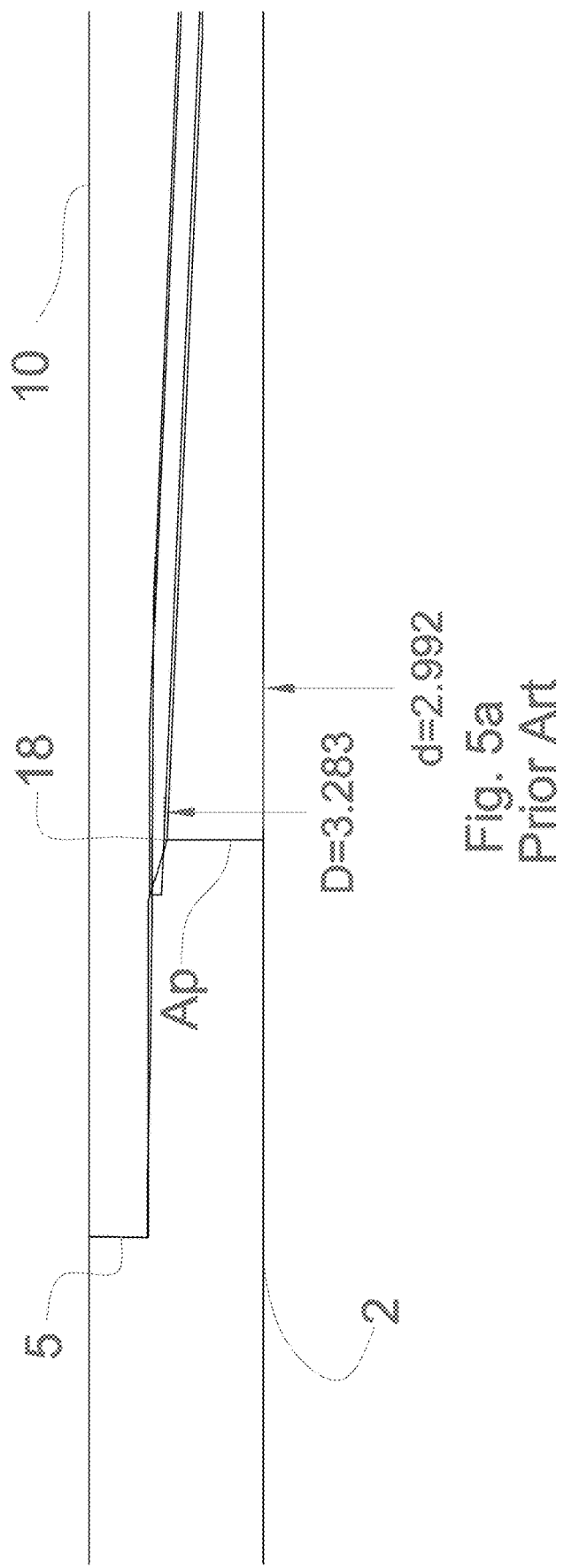

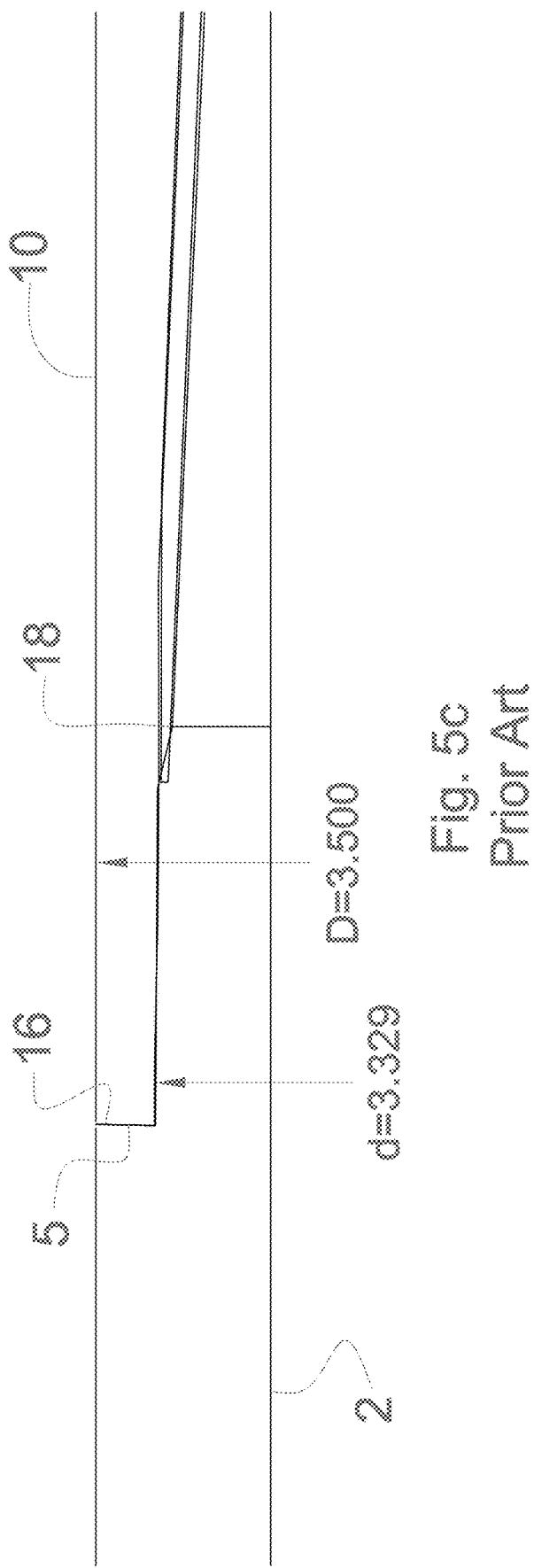

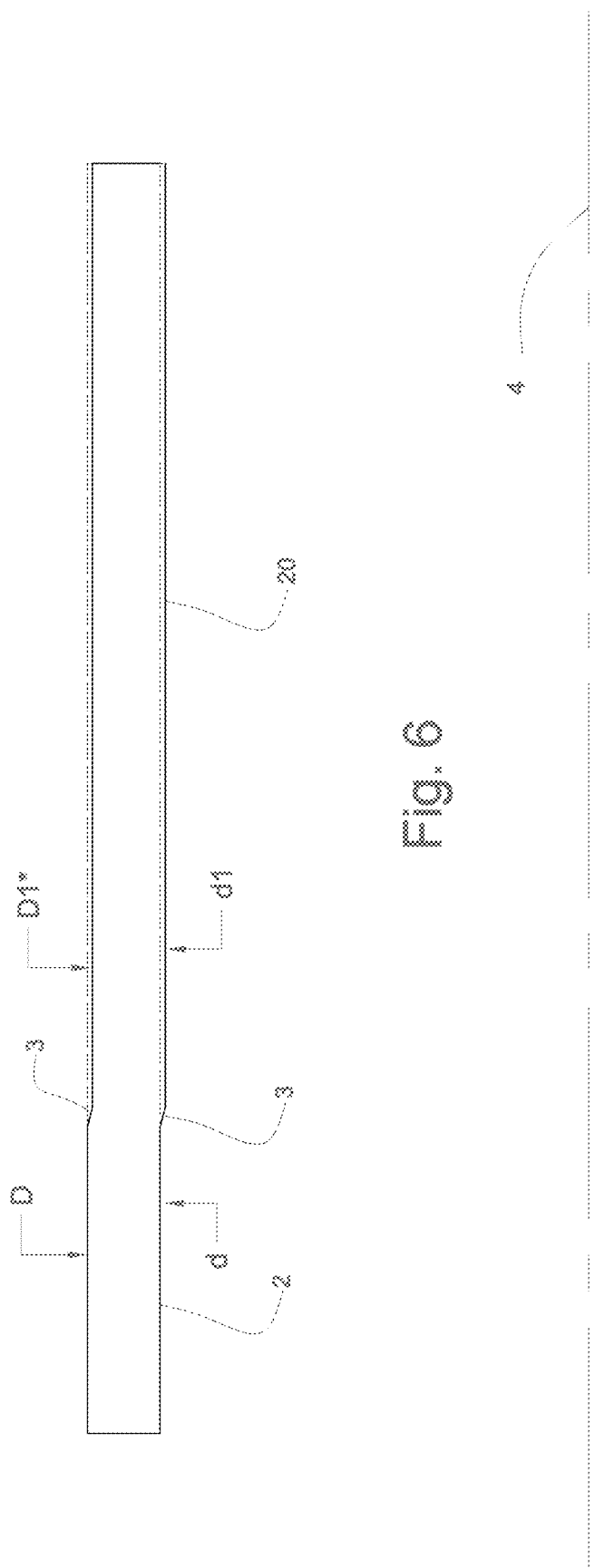

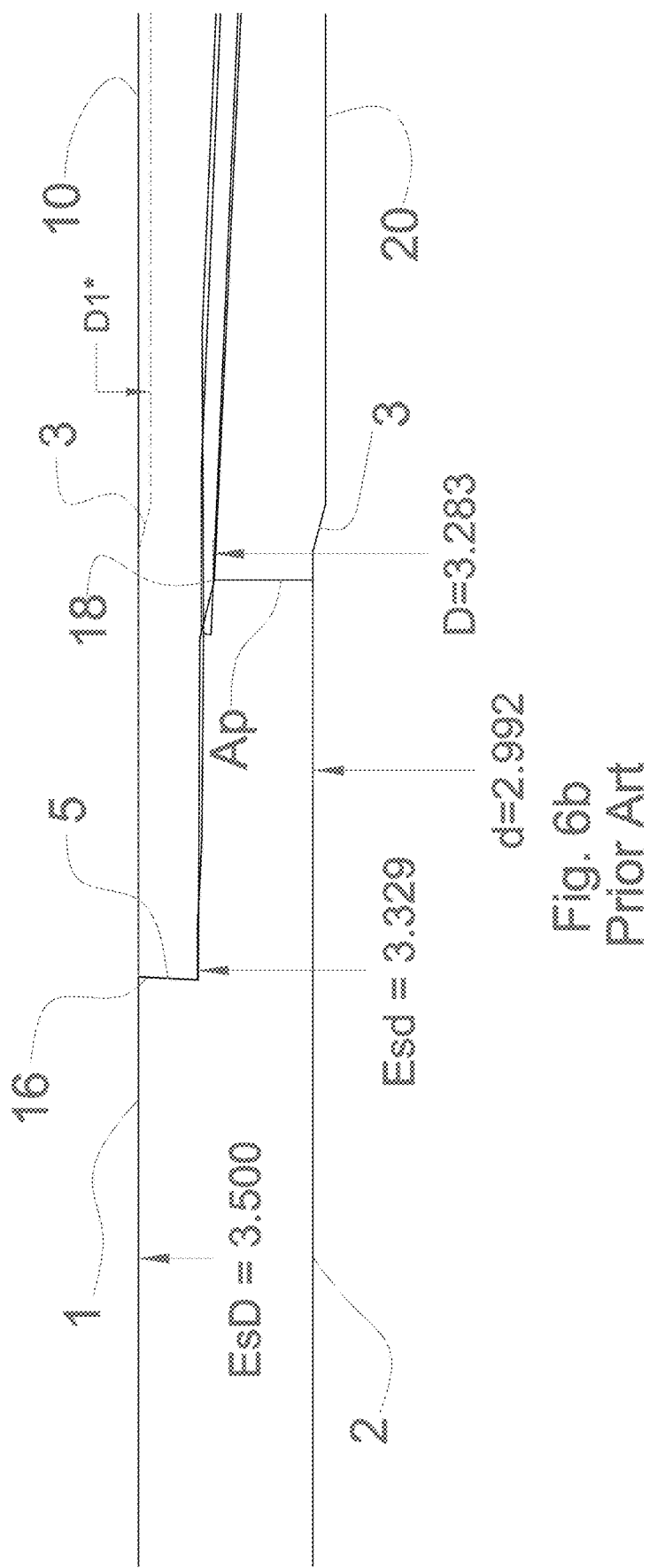

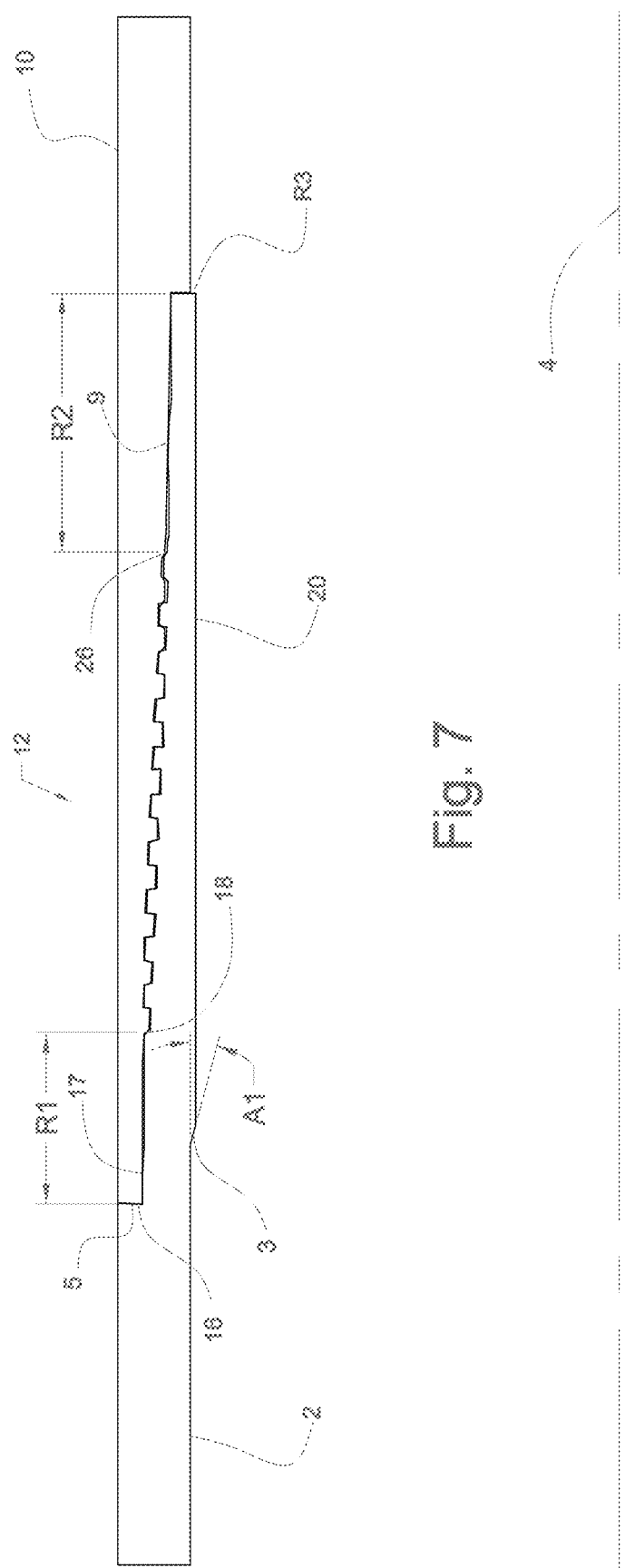

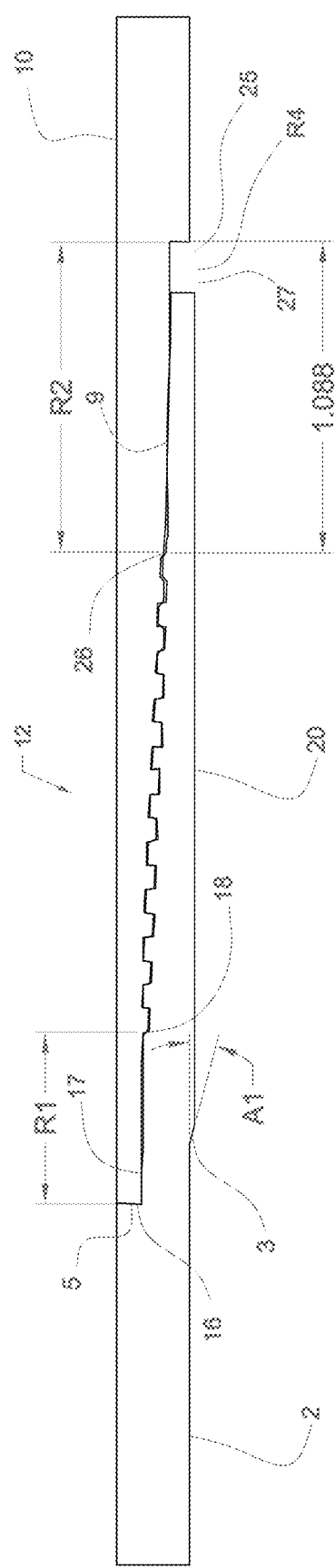

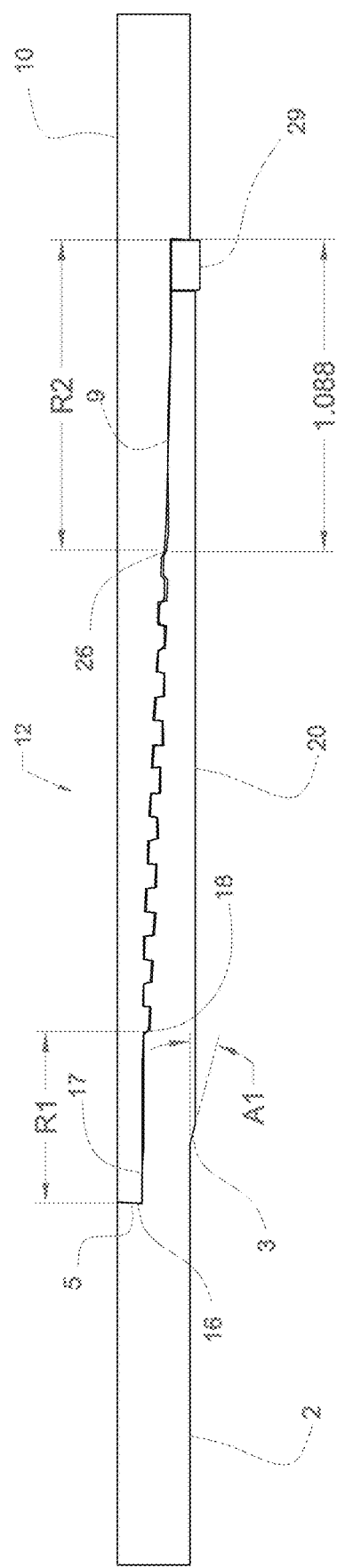

FORMED INTERNAL SURFACE TUBULAR CONNECTION

CROSS-REFERENCE TO RELATED APPLICATIONS

Priority to/of U.S. Provisional Patent Application Ser. No. 63/387,226, filed 13 Dec. 2022, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved oil field tubular connection. More particularly, the present invention relates to an oil field tubular connection wherein a pin member can be cut from a tube that is end-swaged, i.e., reduced in external diameter, prior to cutting threads in the pin member, and allowing for a section of controlled and reduced internal diameter within the pin member. The pin member can be cut such that the termination plane for its mated threads, i.e., threads which transfer tensile stresses from a box member to the pin member, can be located fully within the section of controlled and reduced diameter, thus increasing the termination plane's ability to increase tensile stress, yet also such that the external shoulder is located mostly into the tube body, i.e., in a region essentially unreduced in external diameter from the original tube, thus increasing the external shoulder's capacity to transfer torque and compressive stress.

2. General Background of the Invention

The present invention relates to an improved oil field tubular connection arrangement for joining two sections of tubular (e.g., drill pipe, casing, tubing, completion accessories, and other accessories that joint to production tubing or casing). The improved connection arrangement of the apparatus of the present invention can include a swage transition area or formed surface in between an external shoulder and thread of a pin section or pin member to enable a beneficial load transfer configuration for both torque and tension.

The following possibly relevant US patents and patent application publications are hereby incorporated herein by reference:

TABLE 1

| Patent/Publication No | Title | Issued MM/DD/YYYY |
| --- | --- | --- |
| U.S. Pat. No. 4,813,717 | OILWELL TUBING CONNECTION | Mar. 21, 1989 |
| U.S. Pat. No. 5,143,411 | THREADED TUBULAR CONNECTION | Sep. 1, 1992 |
| U.S. Pat. No. 5,427,418 | HIGH STRENGTH, LOW TORQUE THREADED TUBULAR CONNECTION | Jun. 27, 1995 |
| U.S. Pat. No. 5,516,158 | SELF-SWAGING THREADED TUBULAR CONNECTION | May 14, 1996 |
| U.S. Pat. No. 5,826,921 | THREADED PIPE JOINT | Oct. 27, 1998 |
| U.S. Pat. No. 6,322,110 | TUBULAR CONNECTION | Nov. 27, 2001 |
| RE39869 | HIGH EFFICIENCY DRILL PIPE | Oct. 9, 2007 |
| U.S. Pat. No. 7,527,304 | FLOATING WEDGE THREAD FOR TUBULAR CONNECTION | May 5, 2009 |
| U.S. Pat. No. 7,717,478 | SCALLOPED WEDGE THREADS | May 18, 2010 |
| U.S. Pat. No. 7,780,202 | OILFIELD TUBULAR CONNECTION WITH INCREASED COMPRESSION CAPACITY | Aug. 24, 2010 |
| U.S. Pat. No. 10,961,787 | ENHANCED WELDED PIPE, THREADED CONNECTIONS, AND METHODS FOR ACHIEVING THE SAME | Mar. 30, 2021 |
| 2003/0075924 | CONNECTION | Apr. 24, 2003 |
| 2005/0248153 | THREADED JOINT FOR STEEL PIPES | Nov. 10, 2005 |
| 2007/0132237 | HELICAL GROOVE FOR A TUBULAR CONNECTION | Jun. 14, 2007 |
| 2007/0228729 | TUBULAR GOODS WITH THREADED INTEGRAL JOINT CONNECTIONS | Oct. 4, 2007 |
| 2009/0200798 | TUBULAR THREADED JOINT | Aug. 13, 2009 |
| 2016/0160575 | TUBULAR CONNECTION WITH HELICALLY EXTENDING TORQUE SHOULDER | Jun. 9, 2016 |
| 2017/0146160 | TUBULAR CONNECTION AND ASSOCIATED THREADFORM | May 25, 2017 |
| 2019/0330929 | WEDGE THREAD CONNECTION FOR TUBULAR GOODS | Oct. 31, 2019 |
| 2020/0208760 | CONNECTION HAVING BALANCED PIN AND BOX FACE THICKNESS | Jul. 2, 2020 |
| 2023/0088330 | WEDGE THREAD CONNECTION FOR TUBULAR GOODS | Mar. 23, 2023 |
| EP 1175577 | THREADED CONNECTION WITH HIGH COMPRESSIVE RATING | Jul. 14, 2004 |

TABLE 1-continued

| Patent/Publication No | Title | Issued MM/DD/YYYY |
|---|---|---|
| AU 2007210216 | THREADED PIPE CONNECTION | Aug. 9, 2007 |
| CA 2 697 539 | OILFIELD TUBULAR CONNECTION WITH INCREASED COMPRESSION CAPACITY | Mar. 12, 2009 |
| WO 2013/073712 | TUBULAR THREADED JOINT HAVING IMPROVED HIGH TORQUE PERFORMANCE | May 23, 2013 |
| AU 2013320266 | TUBULAR THREADED CONNECTION | Mar. 27, 2014 |

U.S. Pat. No. 5,427,418 describes the need for swage as a cost-saving alternative to upsetting. This patent does not contemplate the use of the improved swage transition arrangement of the present invention, which allows the present invention to obtain higher torque transfer from the mating surfaces. US patent '418 states as follow (see col. 2, lines 30-56)

"An upset pipe end is generally understood by the industry as being a pipe end that has been heated to a temperature above the lower critical temperature for the pipe metal and then formed under great pressure so as to gather axially, metal of the pipe wall and thereby increase substantially, the cross-section area of the pipe wall at that end of the pipe. After upsetting the end of a high strength pipe, API Specifications require that the entire joint of pipe be quenched and tempered, all of which can greatly increase the cost of a joint of pipe. In an effort to improve the radial clearance and cost of a tubular connection and still retain significant strength, 'near-flush' connections were introduced which comprise 'swaged' pipe ends. Swaged pipe ends are formed at temperatures below the lower critical temperature, by moderate radial pressures that increase or decrease the mean pipe diameter of the swaged zone, but do not substantially change the cross section area thereof. The swaged end of a high strength pipe need only be stress relieved at a temperature below the lower critical temperature, which is far less costly than a quench and temper. A pipe end may be 'swaged-in' to a smaller diameter to receive an external thread or it may be 'swaged-out' to a larger diameter to receive an internal thread. Generally, the outermost diameter of swaged-out ends is less than an API Coupling O.D. but more than pipe body O.D."

U.S. Pat. No. 4,813,717 describes a transition region extending past an external shoulder during an upsetting forming method. This arrangement is more expensive, but not through a swage forming method, which would limit the external shoulder as described in the apparatus of the present invention.

EP1175577B1 expands on the internal diameter (ID) of a pin and outer diameter (OD) of a box. The transition of ID does not occur in the defined region as required in the apparatus of the present invention. The design disclosed in EP1175577B1 does not utilize the full diameter of the expansion OD and does not utilize external mating shoulder for torque transfer.

AU2007210216B2 discloses expanding the box side of a tubular connection, but the connection performance is typically limited by the pin side as the radii are smaller and thus yield a smaller area.

U.S. Pat. No. RE39,869E1 discloses a connection where thicker material is welded to gain connection strength. This process may strengthen the connection but is a more expensive process.

U.S. Pat. No. 5,143,411 does not disclose a shoulder design at the end of threads on the box and pin members.

U.S. Pat. No. 5,826,921 discloses an angle provided above and below and on their torque shoulder, reducing the possible available torque.

US20170146160A1 does not disclose a formed transition/extension area of the apparatus of the present invention.

BRIEF SUMMARY OF THE INVENTION

The present invention relates to a tubular connection apparatus and method that includes a pin section on a tubular with external tapered threads and a box section on a tubular with internal tapered threads. The apparatus of the present invention uses the relationship between the resultant internal surface diameter and transition region to create a connection that utilizes both a mating external shoulder that has an outer diameter that can be about equal to the outer diameter of the tubular sections or tube assembly of both a pin section and a box section and preferably "straddles" the transition region such that the internal pin member also retains full benefit from the formed internal surface diameter throughout the last engaged pin thread increasing the pin member tension strength. The mating external shoulder can have an outer diameter that is larger or smaller than the outer diameter of the tubular sections or tube assembly of the pin and box sections.

The apparatus of the present invention is a tubular connection apparatus comprising a pin joint or pin section with external tapered threads and a box joint or box section with internal tapered threads. The pin and the box threads mate when two tubulars or joints are assembled allowing the transfer of stresses when loading occurs between the two mated tubulars. The pin preferably contains a diameter on the internal surface which is formed prior to cutting. The formed diameter on the internal surface is preferably positioned such that the mating threads between the pin and the box are located completely on the area of the pin that contains the formed internal surface whereby allowing enhanced tension performance on all the mated threads increasing the overall axial loading performance of the connection.

The improved connection of the present invention has a mating shoulder between the pin and the box that resists torsional loading after mating. The mating shoulder is preferably located after the formed diameter on the internal surface of the pin that transitions into the internal tubular diameter whereby not reducing the thickness of the external mating shoulder from the forming process and providing maximum possible resistance to torsional loading during assembly of the connection of two tubular sections.

In one preferred embodiment, the present invention is a tubular connection including a pin section having external tapered threads, a box section having internal tapered threads, wherein the pin external tapered threads and the box internal tapered threads mate when assembled, wherein the pin threads have an external diameter, wherein the box threads have an internal diameter, wherein the pin has an internal surface, the internal surface having a diameter, and wherein the threads are located in the internal surface.

In one embodiment, the connection apparatus of the present invention can have a mating shoulder between the pin and the box.

In one embodiment, the diameter on the internal surface can be formed prior to cutting.

In one embodiment the threads can be fully contained in the diameter on the internal surface.

In one embodiment, the mating shoulder can be located on the tubular and not on the internal surface diameter of the pin or where the pin transitions into the internal tubular diameter whereby not reducing the thickness of the external mating shoulder.

In one embodiment, the mating shoulder can be located at any position on the tubular but not on the formed internal surface or transition to it.

In one embodiment, the present invention is a tubular connection including a pin having external tapered threads, an internal surface, and an internal shoulder, a box having an external shoulder, an internal mating shoulder, and internal tapered threads, and wherein the pin external tapered threads and the box internal tapered threads mate when assembled, wherein the pin threads are located in the internal surface, and wherein the box external shoulder is positioned before the pin internal surface.

In one embodiment, the pin threads and the box threads can be fully contained in the pin internal surface.

In one embodiment, the pin internal surface can have a transition region having an angle of the transition.

In one embodiment, the angle of transition can be between about 2-45 degrees

In one embodiment, the internal mating shoulder and last pin thread can be about 0.100-1.000" apart. In an example connection, the internal mating shoulder and the last pin thread can be about 0.583 inches apart.

In one embodiment, the internal mating shoulder preferably comprises an external seal.

In one embodiment, the pin internal shoulder preferably comprises an internal seal.

In one embodiment, further comprising a groove at the pin internal shoulder.

The present invention includes a tubular connection comprising a tube body including a pin member having and internal surface, external threads and a pin external shoulder, and a box member having internal threads and a box external shoulder, the tube body having an internal diameter. An expansion section can be provided on the pin internal surface that reduces the tube body internal diameter. The pin external shoulder and the box external shoulder can mate before the expansion section when assembled. The pin external threads and the box internal threads can mate after the expansion section when assembled.

In one embodiment, the expansion section can extend about 2-45 degrees away from the pin internal surface.

In one embodiment, the tube body can have a first internal diameter before the expansion section and a second internal diameter after the expansion section, wherein the first internal diameter can be greater than the second internal diameter.

In one embodiment, a pin internal shoulder can be mated with a box internal shoulder.

In one embodiment, a gas or liquid seal can be provided in between the mated pin and box external shoulders and the start of the mated pin and box threads.

In one embodiment, a gas or liquid seal can be provided in between the end of the mated pin and box threads and the mated pin and box internal shoulders.

In one embodiment, a second expansion section can be provided on the box member.

The present invention includes a tubular connection comprising a pin member having and internal surface, external threads, a pin external shoulder, an internal diameter, and an expansion section on the pin internal surface that reduces the pin internal diameter, and a box member having internal threads and a box external shoulder. The pin external threads and the box internal threads can mate when assembled. The pin external shoulder and the box internal shoulder can mate when assembled. The expansion section can be positioned in between the mated shoulders and the mated threads.

In one embodiment, the pin can have a first internal diameter before the expansion section and a second internal diameter after the expansion section, wherein the first internal diameter can be greater than the second internal diameter.

In one embodiment, the expansion section can extend about 2-45 degrees away from the pin internal surface.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5a shows a prior art connection showing the pin member area;

FIG. 5c shows a prior art connection showing the external mating shoulder area;

FIG. 6 shows the tubular material of a preferred embodiment of the apparatus of the present invention prior to cutting the connection;

FIG. 6b shows a prior art connection showing an undesired result;

FIG. 7 shows a preferred embodiment of the apparatus of the present invention;

FIG. 8 shows a preferred embodiment of the apparatus of the present invention;

FIG. 8a shows a connection with an optional ring installed; and

DETAILED DESCRIPTION OF THE INVENTION

Figure 1:
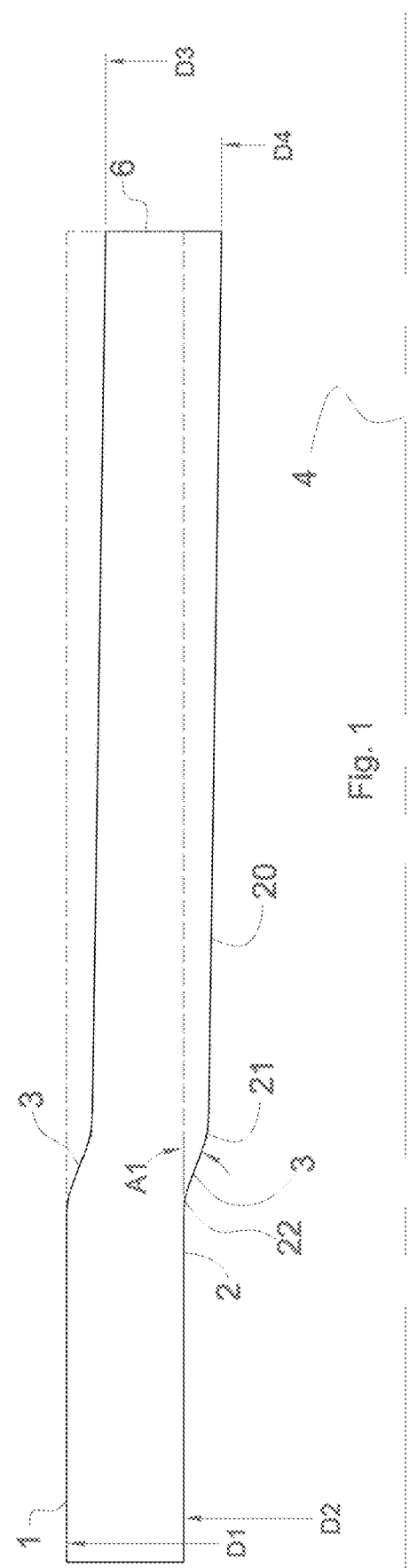
FIG. 1 shows a swaged tubular pin process before a pin member is cut, wherein the dashed lines represent a tubular prior the swaging process.

The following description relies on examples of the invention in practice. These are examples only, and are not meant to limit the invention to only these parts, measurements and specifications.

The apparatus of the present invention is designated generally by the numeral 12 in FIGS. 3, 6C and 7-8. The apparatus 12 of the present invention provides an improved tubular and connection 12 having a central axis 4 and comprising a pin section or member 2 having external tapered threads 13, a pin external shoulder 5 and a formed internal surface/expansion area 3 having angle A1, and a box section or member 10 with internal tapered threads 14 and a box external shoulder 16 (see FIGS. 7-8).

As seen in FIG. 1, the tubular body I from which the pin member 2 can be cut (herein referred to as the "pin tube") can be swaged, thereby reducing the outside diameter from the un-swaged outside diameter (D1) to an as-swaged outer diameter (D3). As-swaged outer diameter (D3) can be seen at the pin tube face 6. The swaging process can also reduce the tubular body 1 inside diameter from the un-swaged inside diameter (D2) to an as-swaged inside diameter (D4), as seen at the pin tube face 6. The swaging of tubular body I creates angle A1 and formed internal surface/expansion area 3 on internal surface 20. The length of formed internal surface/expansion area 3 can preferably be about the same length dimensions as L3. The ranges for sizes and thickness of the internal surface/expansion area 3 can be from 0.067-0.230 inches, more preferably 0.125 inch, 0.139 inch, 0.067 inch, 0.156 inch, 0.193 inch, 0.227 inch, 0.184 inch, 0.230 inch, 0.227 inch. Preferably all internal surface/expansion area 3 sizes can have a tolerance of about +−0.030 inch.

Figure 2:
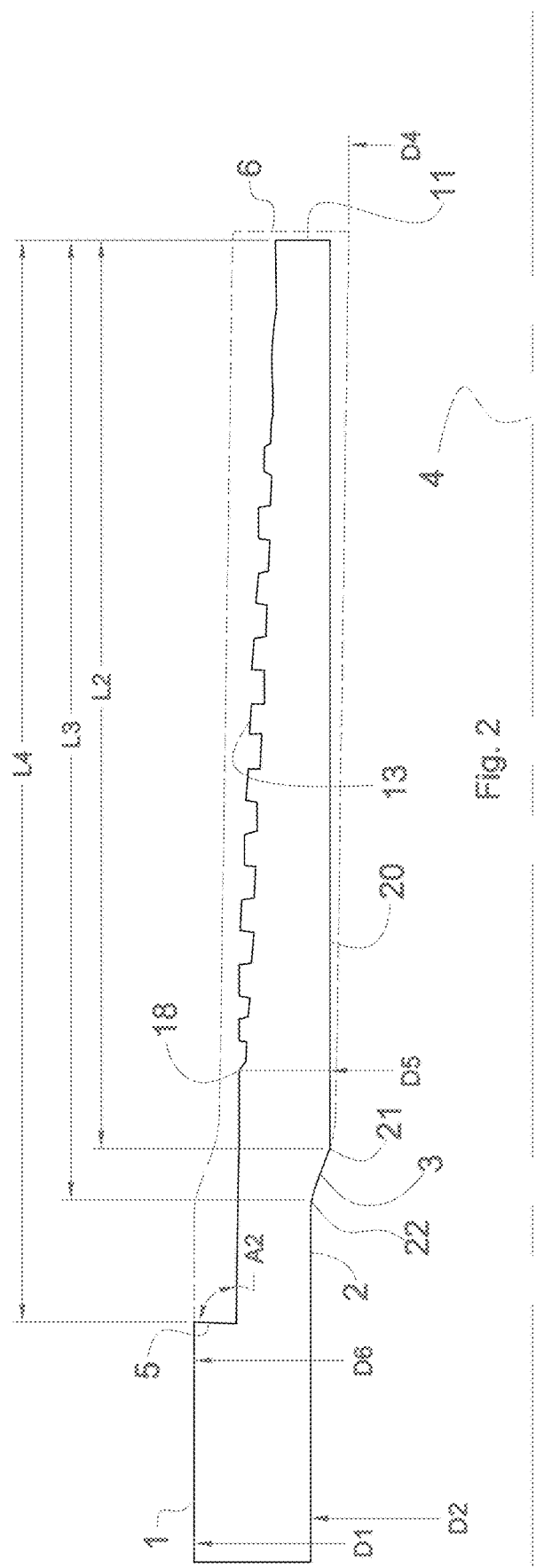
FIG. 2 shows a pin member cut onto a pin tubular with the removed material represented as dashed lines.
Figure 3:
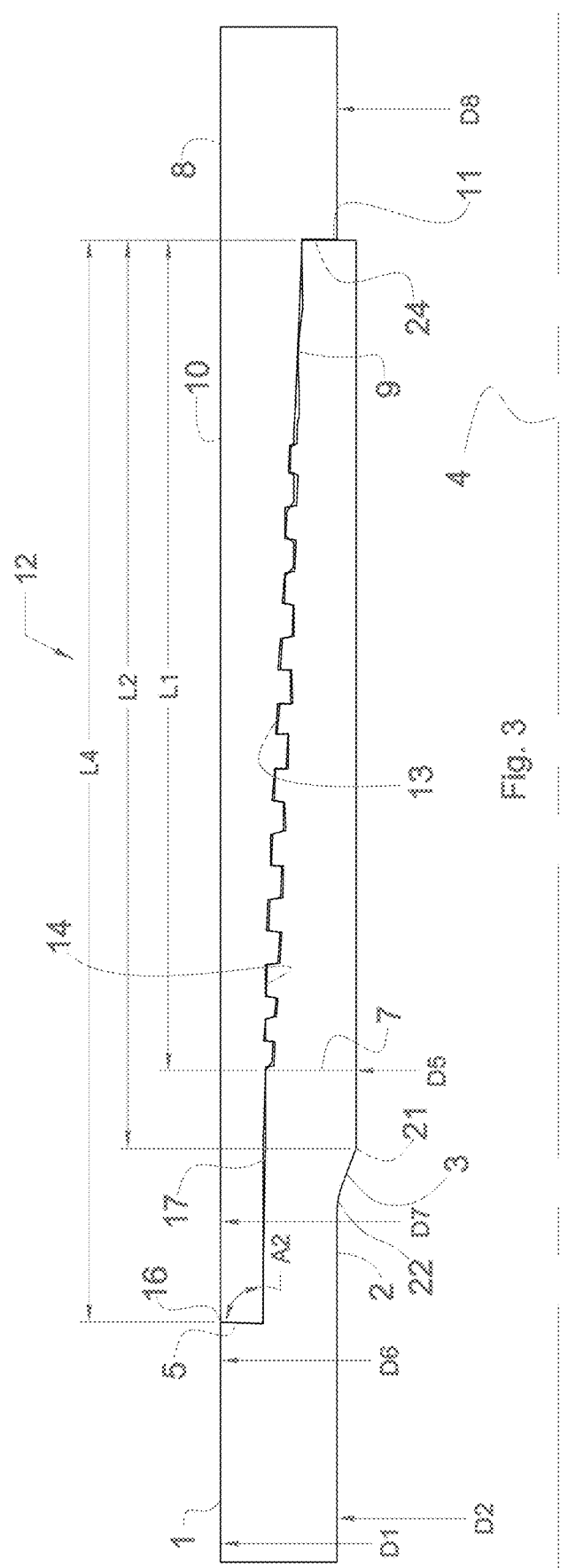
FIG. 3 shows a pin member and a box member in a mated position.

A method of the present invention includes swaging a tubular body 1 before pin member 2 is cut or machined, as seen in FIG. 1, wherein the dashed lines represent a tubular body 1 prior the swaging process. The swaging process reduces the internal diameter of the pin member 2 near the pin face 11 and creates formed internal surface/expansion area 3, L3. After the pin member 2 is swaged, external threads 13 and external shoulder 5 can be cut or machined onto a pin tubular member 2, as seen in FIG. 2, with the removed material represented as dashed lines. As seen in FIG. 2, external threads 13 are preferably machined on the formed internal surface/expansion area 3, L3. As seen in FIG. 2, external shoulder 5 is preferably machined after the formed internal surface/expansion area 3. Box member 10 having internal threads 14 can be assembled with pin member 2, as seen in FIG. 3, wherein the mated shoulders 5, 16 are preferably located after the formed internal surface/expansion area 3 and the mated threads 13, 14 are preferably located on the formed internal surface/expansion area 3, L3.

A method of present invention includes swaging tubes that can be swaged (e.g., cold swaged) using a hydraulic piston. In practice of the present invention, the tubing can be gripped by the machine and the die is moved. Alternatively, this could happen in reverse with a different type of machine, wherein the die is gripped by the machine and tubing is moved. In a process of the present invention, the die can be prepared with a graphite base forging lubricant. The die is forced onto the tubing by the hydraulic piston creating the reduced tubular diameter. The dies of the present invention can be made of high strength tool steel and are hardened after machining to prevent wear since it will be covering such a distance from the tubular face back to about 5".

The swaging process of the present invention has lots of metal-to-metal contact. The die can be removed and the reduced tubing end is then stress relieved inside of an induction heater to a temper range of between about 50-400 F below the tempering temperature of the specific material of tubing being cold forged. The temperature can be held at a specific time between 0-60) seconds. The temperature and time depend on the specific outer diameter (OD) and thickness and amount of reduction of the tubing being cold forged. The tubing is then removed from the induction coil heater.

Pin member 2 can be machined from a swaged pin tubular 1 as seen in FIG. 2. The pin tubular body 1 is shown in dotted lines in FIG. 2. The pin tube face 6 can be machined or "faced-off" creating machined pin face 11 at end 28. Additionally, pin member 2 can be internally machined or "bored-out" creating an internal machined region extending for a length of L2 from the machined pin face 11. Internal machined region L2 can start from pin face 11 and extend to the end 21 of formed internal surface/expansion area 3. L3 marks the length of the "swage-affected region"—that is, the start 22 of formed internal surface/expansion area 3 where the external diameter reduced from D1 and the internal diameter reduced from D2—as measured from machined pin face 11. A pin external shoulder 5 can be cut at a length of L4 from machined pin face 11. L4 can be greater than L3, which results in the outer diameter at the shoulder area D6 being unchanged from the pin tube outer diameter D1. L4 can be greater than L3, which results in formed internal surface/expansion area 3 being positioned after external surface 5.

L1 can have, for example, sizing and length of about 2.287-4.675 inches, more preferably 2.287 inch, 2.538 inch, 2.617 inch, 2.803 inch, 4.675 inch, 2.321 inch, 2.588 inch, 2.533 inch, 2.437 inch, 2.849 inch, and each with about a +/−0.040 to 0.080 inch tolerance. L2 can have, for example, sizing and length of about 2.353-2.719 inches, more preferably 2.353 inch, 2.604 inch, 2.863 inch, 4.719 inch, 2.390 inch, 2.657 inch, 2.872 inch, 2.601 inch, 2.505 inch, 2.917 inch, all with a tolerance of about +/−0.150 inch. L3 can have, for example, sizing and length of about 2.757-5.201 inches, more preferably about 2.757 inches, 3.059 inches, 3.176 inches, 5.201 inches, 2.906 inches, 3.119 inches, 3.334 inches, 3.063 inches, 2.970 inches, 3.379 inches. All with a tolerance of about +−0.005 inch. L4 can have, for example, sizing and length of about 2.757-5.201 inches, more preferably 2.757 inches, 3.059 inches, 3.176 inches, 5.201 inches, 2.906 inches, 3.119 inches, 3.334 inches, 3.063 inches, 2.970 inches, 3.379 inches. All with a tolerance of about +−0.005 inch.

Example lengths of L1-L4 can be as follows:

| tube OD (in) | weight (lb/ft) | wall thickness (in) | L1 (in) (L1 ≤ L2) | L2 (in) | L3 (in) (L2 ≤ L3 ≤ L4) | L4 (in) |
|---|---|---|---|---|---|---|
| 2.375 | 4.60 | 0.190 | 2.282 | 2.354 (+0.297 − 0) | 2.478 | 2.758 (+/−0.002) |
| 2.875 | 6.50 | 0.217 | 2.538 | 2.605 (+0.366 − 0) | 2.744 | 3.059 (+/−0.002) |
| 3.500 | 9.20 | 0.254 | 2.598 | 2.688 (+0.421 − 0) | 2.972 | 3.177 (+/−0.002) |

-continued

| tube OD (in) | weight (lb/ft) | wall thickness (in) | L1 (in) (L1 ≤ L2) | L2 (in) | L3 (in) (L2 ≤ L3 ≤ L4) | L4 (in) |
|---|---|---|---|---|---|---|
| 3.500 | 12.70 | 0.375 | 4.670 | 4.720 (+0.326 − 0) | 4.876 | 5.201 (+/−0.002) |
| 4.000 | 9.50 | 0.226 | 2.315 | 2.390 (+0.309 − 0) | 2.583 | 2.906 (+/−0.002) |
| 4.000 | 11.00 | 0.262 | 2.681 | 2.754 (+0.221 − 0) | 2.981 | 3.216 (+/−0.002) |
| 4.000 | 11.60 | 0.286 | 2.798 | 2.872 (+0.277 − 0) | 3.057 | 3.334 (+/−0.002) |
| 4.500 | 11.60 | 0.250 | 2.527 | 2.601 (+0.221 − 0) | 2.828 | 3.063 (+/−0.002) |
| 4.500 | 12.60 | 0.271 | 2.672 | 2.740 (+0.219 − 0) | 2.967 | 3.202 (+/−0.002) |
| 4.500 | 15.10 | | | | | |

For example, if L2 is manufactured on the high side then L1 can lengthen, and L3 must also move up since L3 will always be in front of L2 due to the swaging process. The range of L3 can be positioned approximately between L2 and L4. The range of L1 is about less than L2. Depending on which pins and boxes and tolerance are assembled, then L1 can range a little.

The tolerances on L2 and L4 are preferable for manufacturing practices, if the angle between L2 and L3 gets sharper then the manufacturing+tolerance can get larger for L2.

The distances between L1 to L2 and L2 to L3 and L3 to L4 are an important feature of the present invention. These lengths can be longer or closer in range and can allow one to put them on any size of tubing. For example, the distance of L1 can vary in length, as with the wall thickness and outer diameter (OD) and desired performance of the connection can make L1 larger or smaller (see below as examples):

| tube OD (in) | weight (lb/ft) | wall thickness (in) | L1-L2 | L2-L3 | L3-L4 |
|---|---|---|---|---|---|
| 2.375 | 4.60 | 0.190 | 0.072 | 0.124 | 0.280 |
| 2.875 | 6.50 | 0.217 | 0.067 | 0.139 | 0.315 |
| 3.500 | 9.20 | 0.254 | 0.090 | 0.284 | 0.205 |
| 3.500 | 12.70 | 0.375 | 0.050 | 0.156 | 0.325 |
| 4.000 | 9.50 | 0.226 | 0.075 | 0.193 | 0.323 |
| 4.000 | 11.00 | 0.262 | 0.073 | 0.227 | 0.235 |
| 4.000 | 11.60 | 0.286 | 0.074 | 0.185 | 0.277 |
| 4.500 | 11.60 | 0.250 | 0.074 | 0.227 | 0.235 |
| 4.500 | 12.60 | 0.271 | 0.068 | 0.227 | 0.235 |
| 4.500 | 15.10 | | | | |

As seen in FIG. 3, pin threads 13 and box threads 14 preferably mate when assembled. One function of mated threads 13, 14 is to transfer tensile stresses from the box member 10 to the pin member 2. The location of the last mating threads Ap 18 results in a place "Ap" where the tensile load transfer is complete, herein defined as "pin tensile area" 7. Pin tensile area 7 is preferably located on the reduced and machined internal pin section 3, L3. This results in the pin tensile area 7 having an internal diameter D5 which is preferably smaller than the pin tube body 1 original internal diameter D2, thereby increasing its cross-sectional area and thus its tension capacity. Stated plainly—decreasing the pin 1 internal diameter—from D2 to D5—at its tensile area 7 increases the cross-sectional area of the pin tensile area 7.

A2 is a machined angle of external shoulder 5. This angle can preferably range from 60-90 degrees as drawn with 0 degrees being aligned with the tube axis and counterclockwise being positive direction. In one example of the design of the present invention, the angle is about 87 degrees with a tolerance of about +/−1 degree. There can be benefits and drawbacks to the angle being both greater and less than 90 degrees. A preferable angle of 87 degrees would keep the stresses from torque in the axial direction and into the tube body rather than out of the axial direction and bending the box shoulder up or down when torque is increased.

When assembled, the pin member 2 and the box member 10 also preferably mate at pin external shoulder 5, facilitating an improved transfer of torsional and compressive stresses from the box member 10 to the pin member 2. Pin external shoulder 5 preferably mates with box external shoulder 16. When the external shoulder diameter D6 is not reduced by the swaging process (i.e. D6 is equal to D1), the contact area of the pin external mating shoulder 5 is maximized. This is a preferred embodiment to maximize the torsional and compressive load transfer through the pin external mated shoulder 5.

Figure 4:
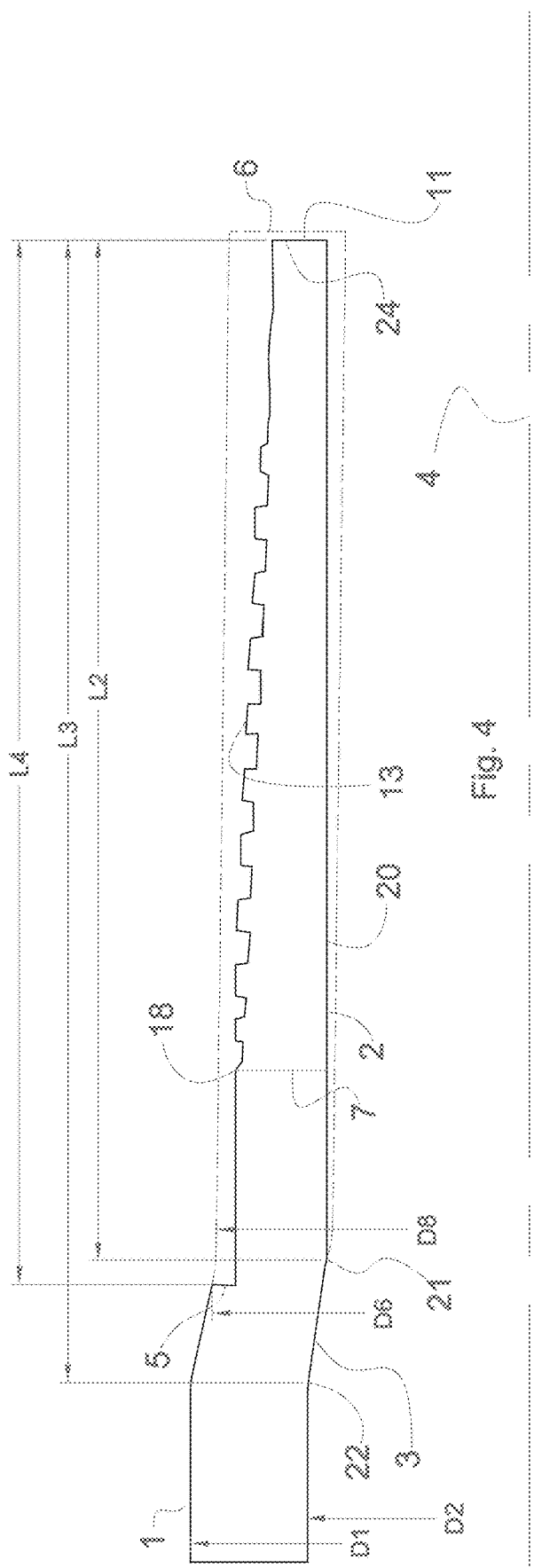
FIG. 4 shows an example of an alternative arrangement wherein a pin member is cut on to a tubular such that a swage transition back to tubular diameters is past the external shoulder, wherein the dashed lines represent the as swaged tubular before cutting.

As seen in FIG. 4, in practice the pin external shoulder diameter D6 can be further reduced by the swaging process, either as an incidental effect of the material flowing, or by design, due to the shape of the pin swaging die. It should be noted that the present invention has diminishing returns as the pin shoulder diameter D6 gets reduced due to its lower limit which is the as swaged external diameter D8 before the pin external shoulder 5 is cut. Therefore, efforts should be made to make diameter D6 as close to tube diameter D1 as possible when cutting pin 2. Such as preferably making L3 less than L4 by optimizing the pin die shape.

The present invention can include the following optional features:
- a mated pin internal shoulder 24 at location of pin face 11.
- a gap 25 between the pin face 11 and box tubular body 10.
- a corrosion resistant barrier between pin face 11 and box tubular body 10.
- a corrosion resistant lining throughout the tubular bodies 1, 8 and across the internal surface of the connection.
- a gas or liquid seal at a location 9—see FIG. 3.
- a gas or liquid seal at a location 17 between the pin external mated shoulder 5 and pin area 7.
- unmated pin 2 or box 10 threads that extend into the regions between the external mated shoulder 5 and pin area 7.
- an expansion section can be formed on box member 10.

Figure 5:
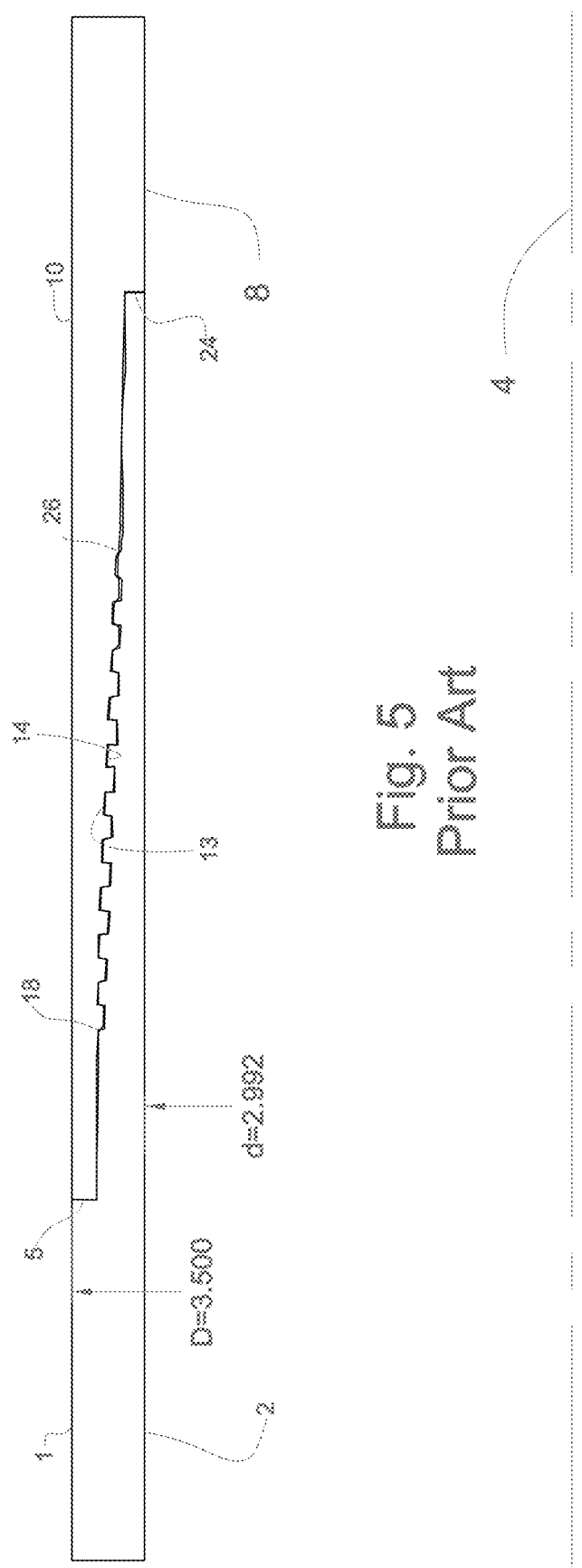
FIG. 5 shows a prior art connection without upset where it has tubular ID and OD showing the tubular area.

FIGS. 5-8 show examples of embodiments of the present invention and prior art. The examples can be prepared preferably using American Petroleum Institute (API) tubular 3.5" diameter, 9.20 #connection of p-110 grade, as seen in FIG. 5. The size of the API tubular of the present invention can be any suitable sizing, such as for example:
2.375", 4.60 #: 2.875", 6.50 #; 3.500", 9.20 #; 3.500", 12.70 #; 4.000", 9.50 #; 4.000", 11.00 #; 4.000", 11.60 #: 4.500", 11.60 #; 4.500", 12.60 #: 4.500", 15.10 #.

FIG. 6 shows an example of pin tubular material 1 prior to cutting the connection.

Figure 6A:
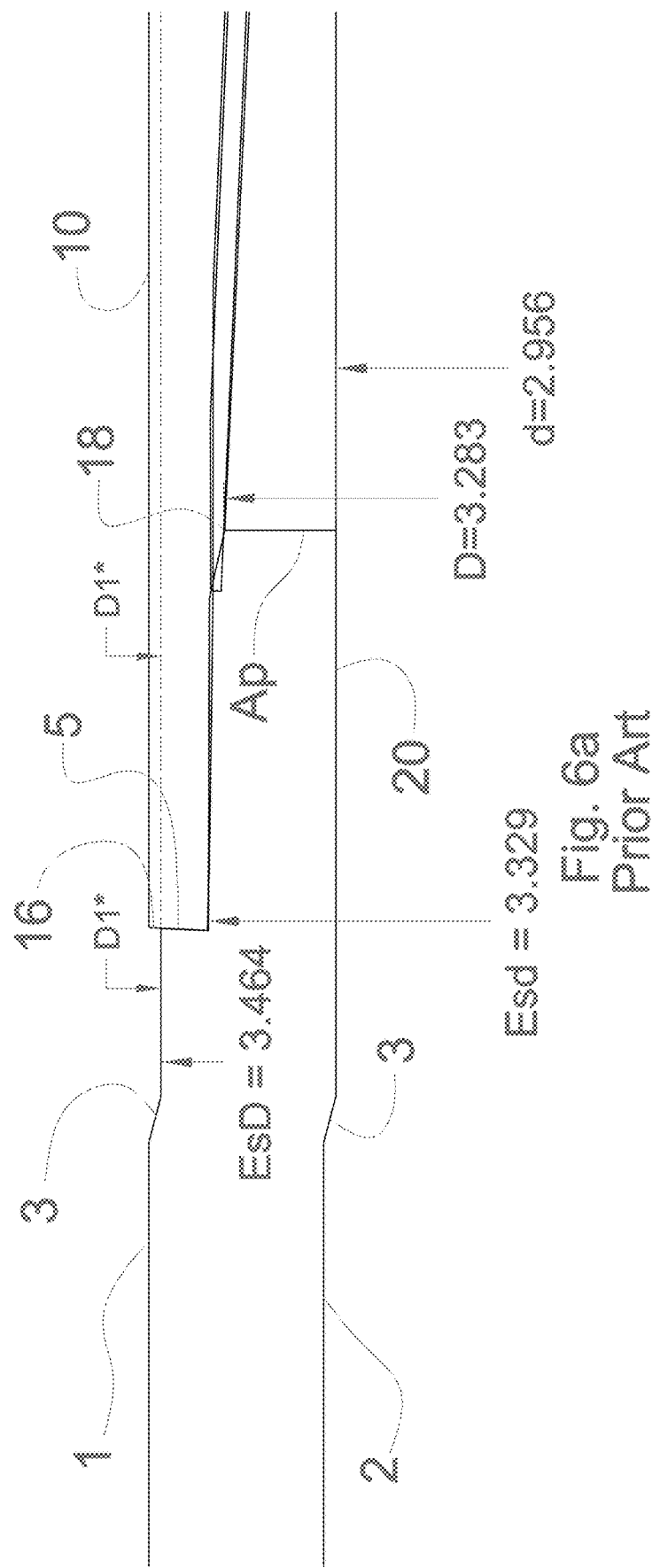
FIG. 6a shows a prior art connection showing an undesired result.
Figure 6C:
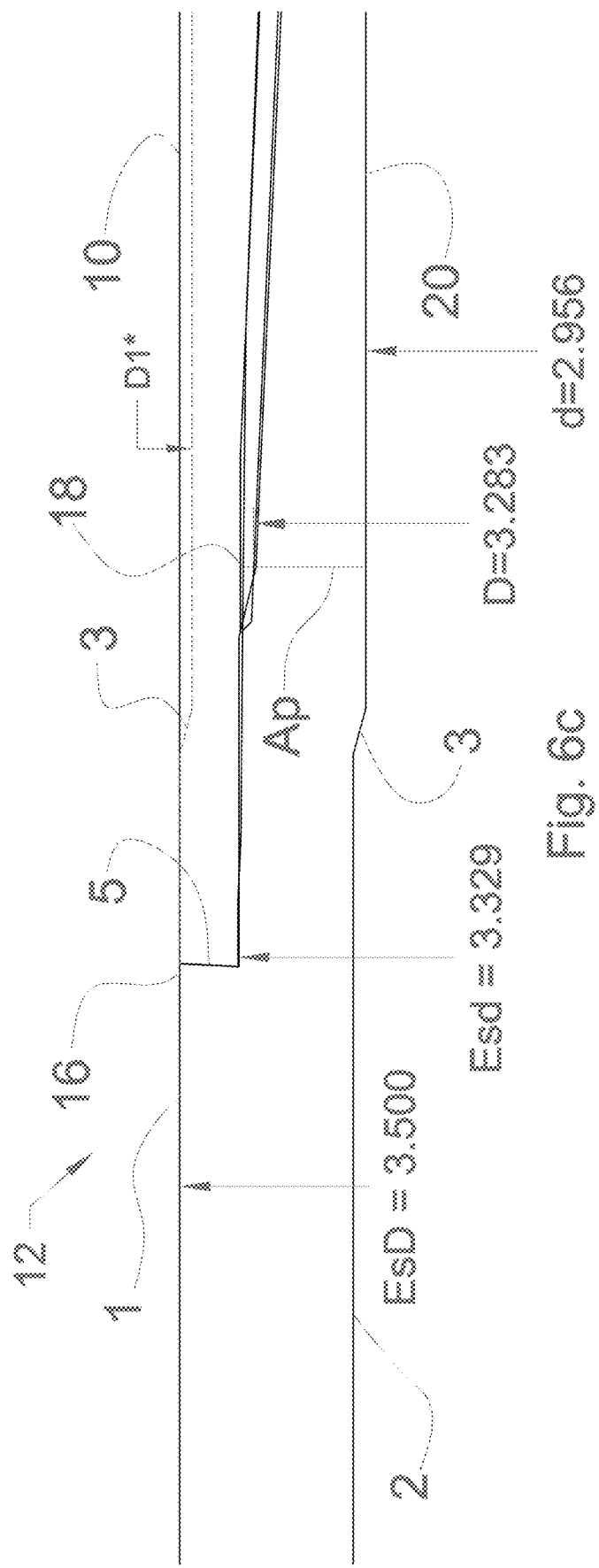
FIG. 6c shows a preferred embodiment of the apparatus of the present invention.

FIGS. 6a-6c show different configurations of placement of the formed internal surface 3 on pin member 2 with dashed lines representing the tubular 1 prior to the swage process and solid lines showing the tubular 1 after the swage process.

The configuration shown in FIG. 6*a* is an example of an apparatus of the present invention that can be beneficial for tension, but detrimental for torque since less external shoulder 5 is mated. As shown in FIG. 6*a*, there is seen a formed internal surface/expansion area 3 that starts after the pin external shoulder item 5 and extends past the mated shoulder 5. Formed internal surface/area 3 also extends to the thread placement "Ap" 18. FIG. 6*a* shows pin member 2 with formed internal surface/expansion area 3 positioned after both the pin external shoulder 5 and the last mated thread "Ap" 18.

The configuration shown in FIG. 6*b* is an example of an apparatus of the present invention that can be beneficial for torque, but detrimental for tension. As shown in FIG. 6*b*, this configuration has not enough formed internal surface/expansion area 3 which is placed before the external shoulder item 5 and before the thread placement "Ap" 18. The dotted lines in FIG. 6*b* show the pin member 2 outside swaged diameter D1* before it was machined away to create the pin.

FIG. 6*c* shows a preferred embodiment of the apparatus of the present invention that is beneficial for tension and torque, as there is proper thread placement 18 on the formed internal surface/expansion area 3 and proper shoulder placement 5, 16 into the body 1 of the pin tubular member 2 and box tubular 8. As seen in FIG. 6*c*, formed internal surface/expansion area 3 is placed before external shoulder 5 and after the last mated thread "Ap" 18.

The cross-section area can be calculated using the equation of tube A=$\pi/4(D^2-d^2)$ where "D" is the outer diameter (OD) of the tube body 12 and "d" is the inner diameter (ID) of the tube body 12, as seen in FIG. 5.

The axial performance in tension of a connection can be found by comparing the area 7 under the last mated thread "Ap" 18, 26 on each supporting member 2, 10 to the area of the tube body 12. This calculation is done for each member, pin member 2 and box member 10. The lesser of the pin 2 or box 10 areas will be the controlling area for the resultant tension performance.

Overall connection tensile performance is found by calculating: Area of lesser member/Area of tubular.

"D" and "d" are identified in each figure and referenced accordingly to each cross-section.

FIG. 5 shows tubular body 12 prior to swaging a formed surface 3. FIG. 5 shows an outer diameter as 3.5" and an internal diameter as 2.992" of tubular 12. The tubular area and the equation yield an area of 2.5902 inches squared.

FIG. 5*a* shows tubular body 12 having an outer diameter as 3.283" at the lasted mated thread (Ap) 18 and an internal diameter as 2.992" of pin member 2. FIG. 5*a* shows the pin member 2 area without the formed internal surface/expansion area 3 diameter and the equation yields an area of 1.4342 inches squared.

Figure 5B:
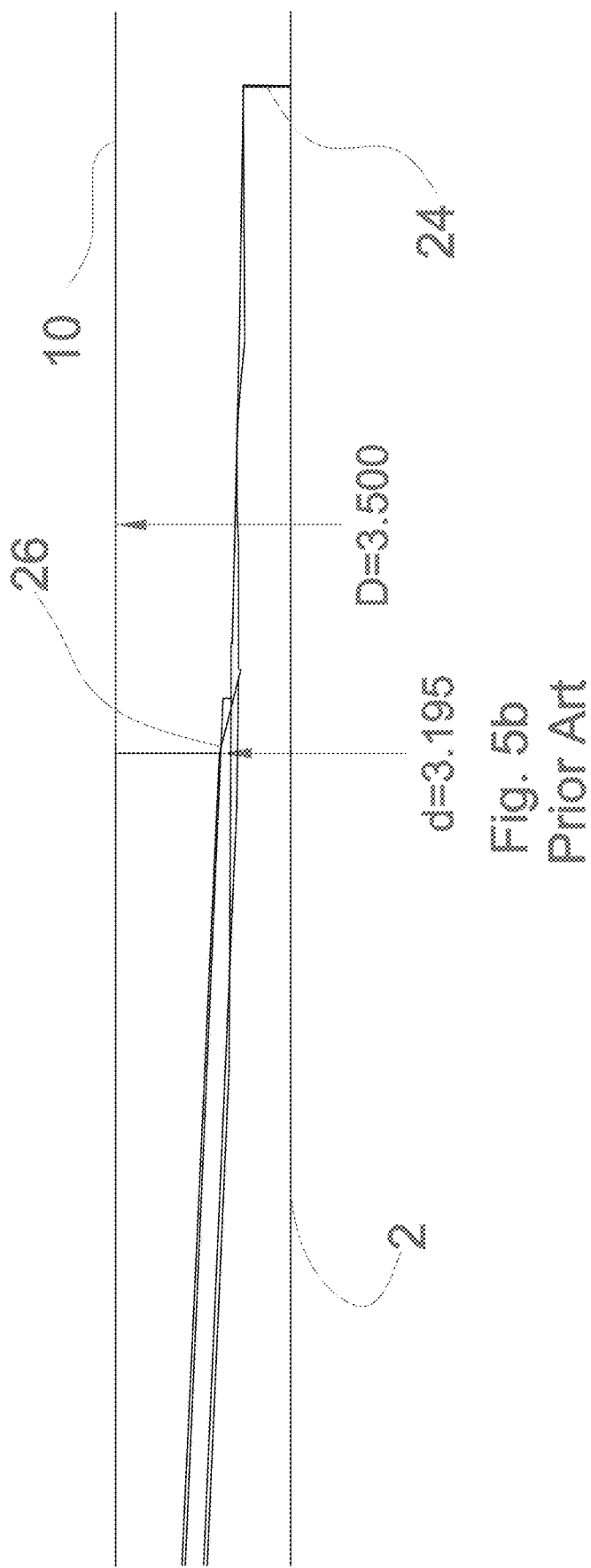
FIG. 5b shows a prior art connection showing the box member area.

FIG. 5*b* shows tubular body 12 having an outer diameter as 3.5" and an internal diameter as 3.195" of box member 10. FIG. 5*b* shows the box member 10 area and the equation yields an area of 1.6038 inches squared.

Overall connection performance in tension (1.4342/2.5902)×100=55.4%, since it appears that pin member 2 is the weaker member between the box member 10 and the pin member 2. (Multiplying by 100 to convert to percent.)

In the configuration shown in FIG. 5*c*, the pin external mating shoulder 5 is providing maximum possible torsional resistance because the shoulder 5 has the largest possible outside diameter D (3.5") and cross-sectional area (3.329"), which can be found through observing the area of the mating faces 5, 16 shown in FIG. 5*c* which calculates to 0.5078 inches squared. Torque is simply compared using area, friction factor and pressure:

Torsional resistance=Friction factor*area*pressure

Friction factor is constant, and pressure is material yield and thus constant. Only the area changes that occur with the specifically located internal surface diameter transition region 3 created from the forming process will be observed.

FIG. 6 shows the tubular internal surface 20 diameter (d1) and the outside diameter (D1*) that can be created from the forming/swaging process, which are reduced radially with forming transition section 3 from the original tubular diameters (D) and (d) as seen in FIG. 5 and FIG. 6. FIG. 6 shows the material prior to cutting the connection in dotted lines.

FIG. 6*a* shows an undesired result when the length between the last mated thread item "Ap" 18 on the pin 2 and the external shoulder item 5 are not placed far enough apart, such that the formed/expansion surface 3 is not positioned in between the shoulder 5 and last mated thread Ap 18. The area on the pin "Ap" is increased because "d" was reduced via the transition/expansion section 3 formed before the last mated thread item "Ap" 18, which preferably gives a larger area compared to that seen in FIG. 5. Pin member 2 area is 1.6023 inches squared. The box member 10 critical area is unchanged, thus it is still 1.6038 inches squared. The limiting member is still the pin 2 but now the overall connection tensile performance is (1.6023/2.5902)*100=61.9%. However, observing the shoulder 5, the connection experiences a reduced area in the torque calculation because the connection does not properly "straddle" the formed annular diameter on the pin member 2. The outside diameter (EsD) of the pin external shoulder 5 has suffered a reduction radially from the desired original tubular diameter of 3.500" to 3.464" and decreasing the shoulder area, as seen in FIG. 6*a*.

FIG. 6*b* shows another undesired result when the length between the last mated thread area "Ap" 18 on the pin 2 and the external shoulder item 5 are not placed close enough together, such that the formed/expansion surface 3 is not positioned in between the shoulder 5 and last mated thread "Ap" 18. The area on the pin 2 is not increased because "Ap" was not positioned to the right of the formed diameter 3 on the internal surface 20, so the internal diameter "d" is not getting reduced properly. Thus, the pin 2 will not get stronger in tension in this combination. The external shoulder 5 is the same as in FIG. 5 so there is a full torque shoulder in this configuration.

FIG. 6*c* is an example of a preferred embodiment of the apparatus of the present invention and a desired result wherein the length between the last mated thread plane "Ap" 18 on the pin 2 and the external shoulder item 5 are properly placed. Preferred placement of transition section 3 on internal surface 20 is in between the external shoulder 5 and the last mated thread "Ap" 18, as seen in FIG. 6*c*. For example, dimensions on a connection (R1 as seen in FIGS. 7, 8) can be for example about 0.100-1.000 inches, and more preferably about 0.471 inch, 0.516 inch, 0.560 inch, 0.527 inch, 0.585 inch, 0.531 inch. When this occurs the transition region/section 3 and internal surface 20 are properly "straddled" (positioned in between the external shoulder 5 and the last mated thread "Ap" 18). The last mated thread "Ap" 18 is preferably located to the right of the transition region/section 3. The area on the pin 2 can preferably see the increase because of the reduction of diameter "d" during the forming process. Also, the external shoulder 5 is the same as in FIG. 5 so there is a full torque shoulder. The proper placement of both external shoulder 5 and last mated threads 18 in relation to the internal surface diameter 20 is an important feature.

A preferred embodiment of the present invention may or may not have a contacting pin internal shoulder 24 in the area "R3" as shown in FIG. 7.

The angle of the transition A1 can preferably be such that the full transition should occur between the mating surfaces. The angle A1 could vary preferably between about 2-45 degrees as shown in FIGS. 7 and 8. The angle A1 can be 10-12 degrees, and more preferably 10.272 degrees, 10.445 degrees, 11.279 degrees, 10.665 degrees, 10.890 degrees, 11.062 degrees, 10.641 degrees, 10.764 degrees. Preferably, the angle is created to show enough transition length between L2 and L3 such that it falls between the area 7 plane and mating shoulders 5.

In a preferred embodiment, the mating shoulder 5 can be located at any position on the tubular 12, but not on the formed internal surface 20 or transition/expansion section 3 to it. As seen in FIG. 7, the mating external shoulder 5 preferably occurs to the left of angle A1.

The length/area R1 between the mating shoulder 5 and last mating pin thread "Ap" 18 may vary between 0.100-1.000" inches, and preferably can be long enough such that the tolerance may make the process easy to manufacture.

The connection seen in FIG. 7 may or may not have an external seal 17 located in the area R1 between the last mated thread "Ap" 18 on the pin 2 and the external torque shoulder 5.

The connection seen in FIG. 7 may or may not have an internal seal 9 located in the area R2 between the last mated thread 26 on the box 10 and the pin internal shoulder 24 near area R3. The length of R2 can preferably be between 0.500-1.500" inches, more preferably about 0.700-1.000 inch, such as for example 0.849 inch, 0.804 inch, 0.904 inch, 0.865 inch, 0.723 inch, 0.899 inch, 0.863 inch, 0.768 inch, 0.789 inch, 0.789 inch, 0.733 inch. These can have a tolerance of about +/−0.040 inch The connection seen in FIG. 7 may or may not have an internal seal 9 located in the area "R2" between the last mated thread 26 on the box 10 and the area R3 (if there is not an internal shoulder 24).

Figure 8B:
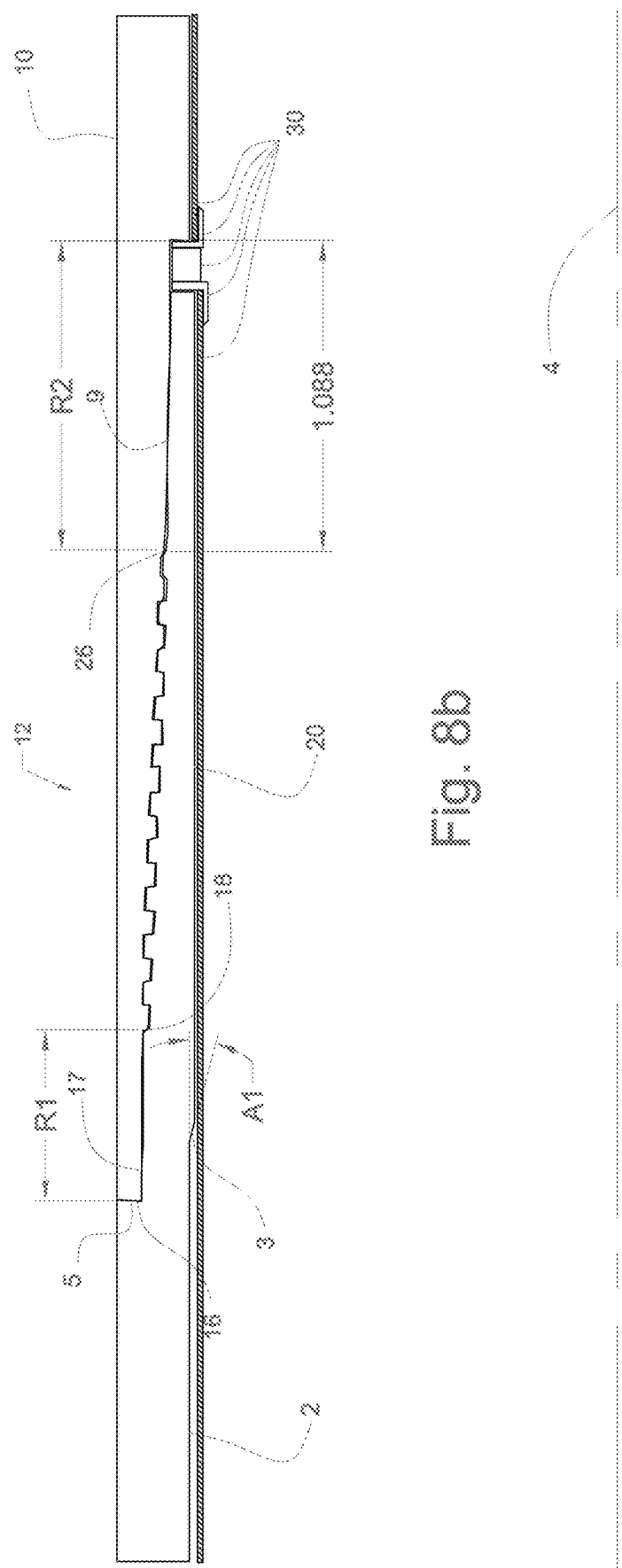
FIG. 8b shows a connection with an optional liner and liner interface equipment installed.

The connection seen in FIG. 8 can also come in a variation of without an internal shoulder 24 and with a groove 27 in region R4 as shown in FIG. 8 for seating rings and liner applications, for example, as seen in FIGS. 8*a* and 8*b*.

The connection seen in FIG. 8 may or may not have an external seal 17 located in the area R1 between the last mated thread Ap 18 on the pin 2 and the external torque shoulder 5.

The connection seen in FIG. 8 may or may not have an internal seal 9 located in the area R2 between the last mated thread 26 on the box 10 and the internal groove 27 in area R4.

As seen in FIGS. 7 and 8, there is optionally no transition section on the outer diameter of the tubing 12.

PARTS LIST

Parts Number Description
 1 pin tubular body
 2 pin member/pin tube
 3 formed internal surface/expansion area on pin 2
 4 tubular central axis
 5 pin external shoulder/pin external mated shoulder
 6 pin face
 7 pin tensile area
 8 box tubular body
 9 internal seal
 10 box member
 11 pin machined face
 12 improved tubular connection apparatus/tubular apparatus
 13 pin external tapered threads
 14 box internal tapered threads
 16 box external shoulder
 17 external seal
 18 last mated thread on pin 2
 20 internal surface/formed internal surface diameter
 21 end of formed surface/expansion section 3
 22 start of formed surface/expansion section 3
 24 pin internal shoulder
 25 gap
 26 last mated thread on box 10
 27 groove
 28 pin member/section end
 29 ring
 30 liner/liner application
 D tube body/joint of pipe/outer diameter
 d tube body internal diameter
 Ap last mated thread/item
 R1 area between mating shoulder 5 and last mating pin thread Ap/optional internal seal
 R2 area between area R3 and last mating thread 26 on box member 10
 R3 area for optional contacting internal shoulder
 R4 region for optional groove
 A1 angle of transition 3
 A2 angle of external mated shoulder 5
 D1 pin tubular outside diameter
 D1* pin tubular swaged outside diameter
 D2 pin tubular inside diameter
 D3 pin tubular swaged outside diameter
 D4 pin tubular swaged inside diameter
 D5 pin member as machined inside diameter
 D6 pin external shoulder outside diameter
 D7 box external shoulder outside diameter
 D8 pin tubular swaged outside diameter before shoulder is cut
 L1 length from pin face 11 to pin area 7
 L2 length from pin face 11 to diameter D5 of Formed surface 3/end 21 of formed surface 3
 L3 length from pin face 11 to diameter D2 of formed surface 3/start 22 of formed surface 3
 L4 length from pin face 11 to diameter D6/external mated shoulder 5

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A tubular connection apparatus, comprising:
 a) a pin tubular section having a pin face, external tapered threads, a pin external shoulder and an internal surface having a first diameter and a second diameter;
 b) a box tubular section having internal tapered threads and a box external shoulder;
 c) wherein the pin external shoulder and the box external shoulder mate on the connection having the first diameter upon assembly of the pin tubular section to the box tubular section;

d) wherein the external tapered threads and the internal tapered threads mate and are fully contained on the connection having the second diameter upon assembly of the pin tubular section to the box tubular section;

e) wherein the pin internal surface has a transition region having an angle between the first diameter and the second diameter; and f) further comprising a pin internal shoulder mated with a box internal shoulder.

2. The tubular connection apparatus of claim 1, wherein the angle is between 2-45 degrees.

3. The tubular connection apparatus of claim 1, wherein the mated external shoulders and last pin thread can be about 0.100-1.000 inches apart.

4. The tubular connection apparatus of claim 1, wherein the pin tubular section is end-swaged to create the second diameter.

5. The tubular connection apparatus of claim 4, wherein the swaging includes cold swaging the pin tubular section.

6. The tubular connection apparatus of claim 1, wherein the mated external shoulders are positioned after the angle.

7. The tubular connection apparatus of claim 1, wherein the mated threads are positioned before the angle of the transition region.

8. The tubular connection apparatus of claim 1, further comprising providing a seal positioned in between the mated external shoulders and the end of the mated threads.

9. The tubular connection apparatus of claim 1, further comprising providing a seal positioned in between the start of the mated threads and the pin face.

10. The tubular connection apparatus of claim 1, further comprising a groove in between the pin face and the box tubular section.

11. The tubular connection apparatus of claim 10, further comprising providing one or more seating rings or a liner in the groove.

12. A tubular connection apparatus, comprising:

a) a tube body including a pin member having an internal surface, external threads and a pin external shoulder, and a box member having internal threads and a box external shoulder, the tube body having a first internal diameter;

b) an expansion section on the pin internal surface that reduces the tube body internal diameter;

c) wherein upon assembly of the pin member to the box member, the pin external shoulder and the box external shoulder mate at a position after the expansion section on the first internal diameter; and d) wherein upon assembly of the pin member to the box member, the pin external threads and the box internal threads mate on the expansion section and are fully located on the reduced internal diameter; and e) further comprising a pin internal shoulder mated with a box internal shoulder.

13. The tubular connection apparatus of claim 12, wherein the expansion section can extend about 2-45 degrees away from the tube body first internal diameter.

14. The tubular connection apparatus of claim 12, further comprising a gas or liquid seal in between the mated pin and box external shoulders and the start of the mated pin and box threads.

15. The tubular connection apparatus of claim 12, further comprising a gas or liquid seal in between the end of the mated pin and box threads and the mated pin and box internal shoulders.

16. A tubular connection apparatus, comprising:

a) a pin member having an internal surface having a first diameter and a second diameter, external threads, a pin external shoulder, and a formed extension section that reduces the first diameter to the second diameter;

b) a box member having internal threads and a box external shoulder;

c) wherein the pin external threads and the box internal threads mate when the pin and box members are assembled;

d) wherein the pin external shoulder and the box external shoulder mate after the formed extension section when the pin and box members are assembled;

e) wherein when assembled, the mated threads are fully located on the formed extension section having the reduced second diameter; and f) further comprising a pin internal shoulder mated with a box internal shoulder.

17. The tubular connection apparatus of claim 16, wherein the pin has a first internal diameter after the formed extension section and a second internal diameter before the formed extension section, wherein the first internal diameter is greater than the second internal diameter.

18. The tubular connection apparatus of claim 16, wherein the formed extension section can extend 2-45 degrees away from the first internal diameter.

19. The tubular connection apparatus of claim 16, further comprising a gas or liquid seal in between the mated pin and box external shoulders and the start of the mated pin and box threads.

20. The tubular connection apparatus of claim 16, further comprising a gas or liquid seal in between the end of the mated pin and box threads and the mated pin and box internal shoulders.

* * * * *